Feb. 24, 1931.   E. A. HOBART   1,794,291
BRUSH SUPPORT FOR ELECTRICAL APPARATUS
Filed Aug. 2, 1928   4 Sheets-Sheet 4
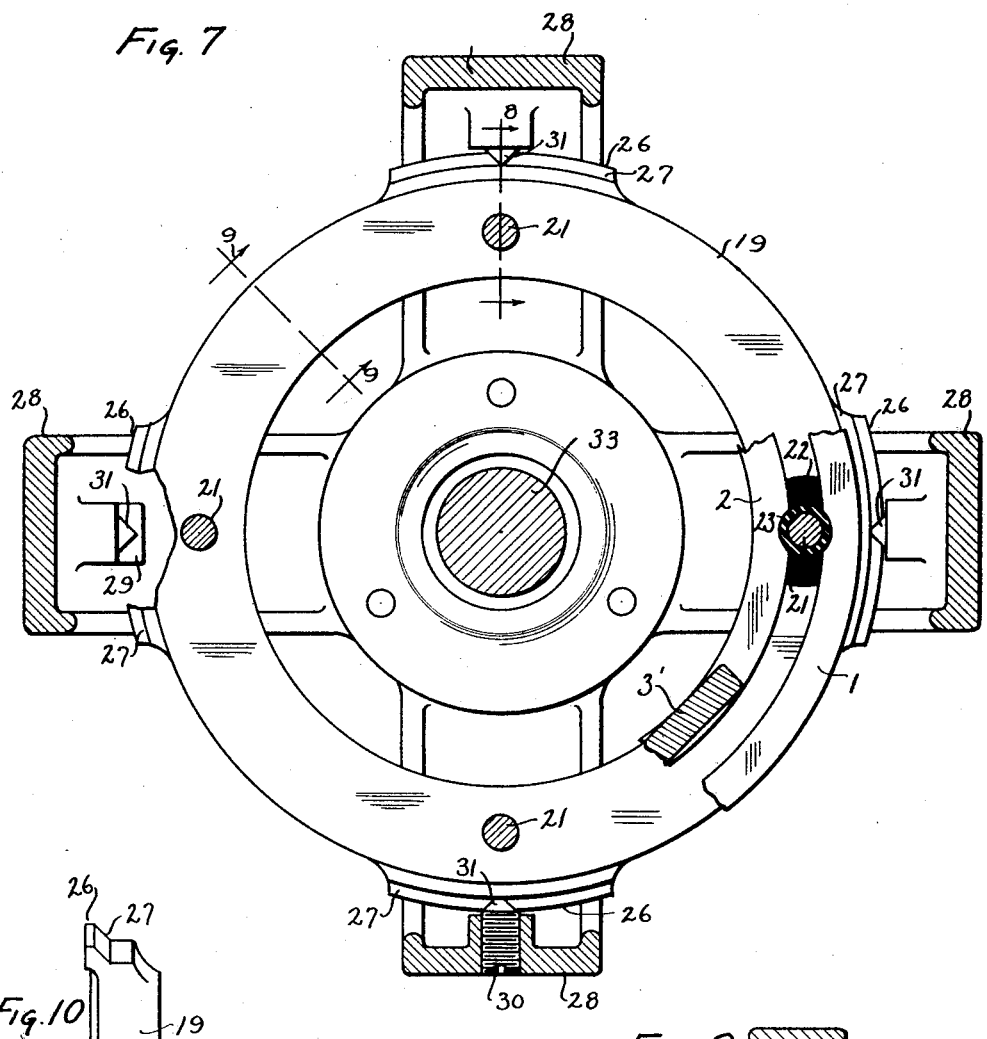
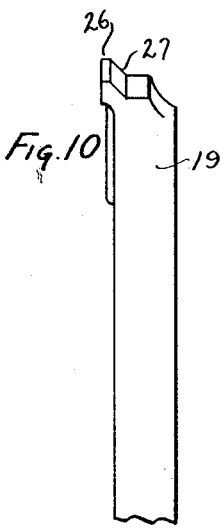
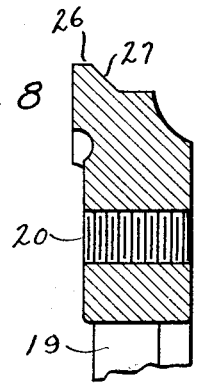
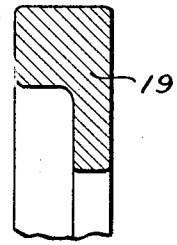
INVENTOR
Edward A. Hobart
BY
Toulmin & Toulmin
ATTORNEY Patented Feb. 24, 1931

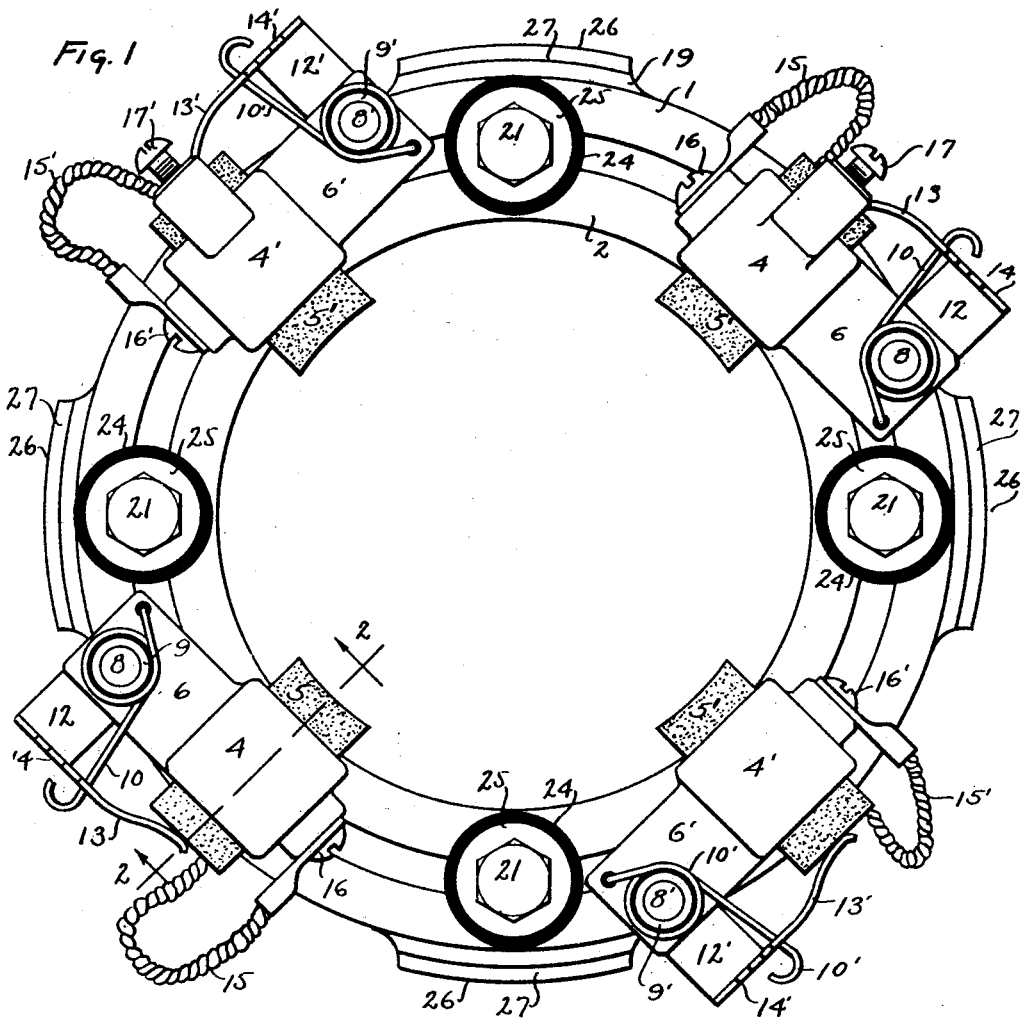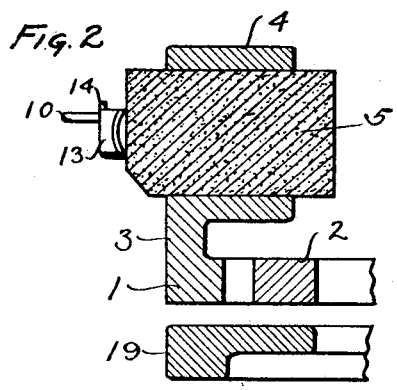

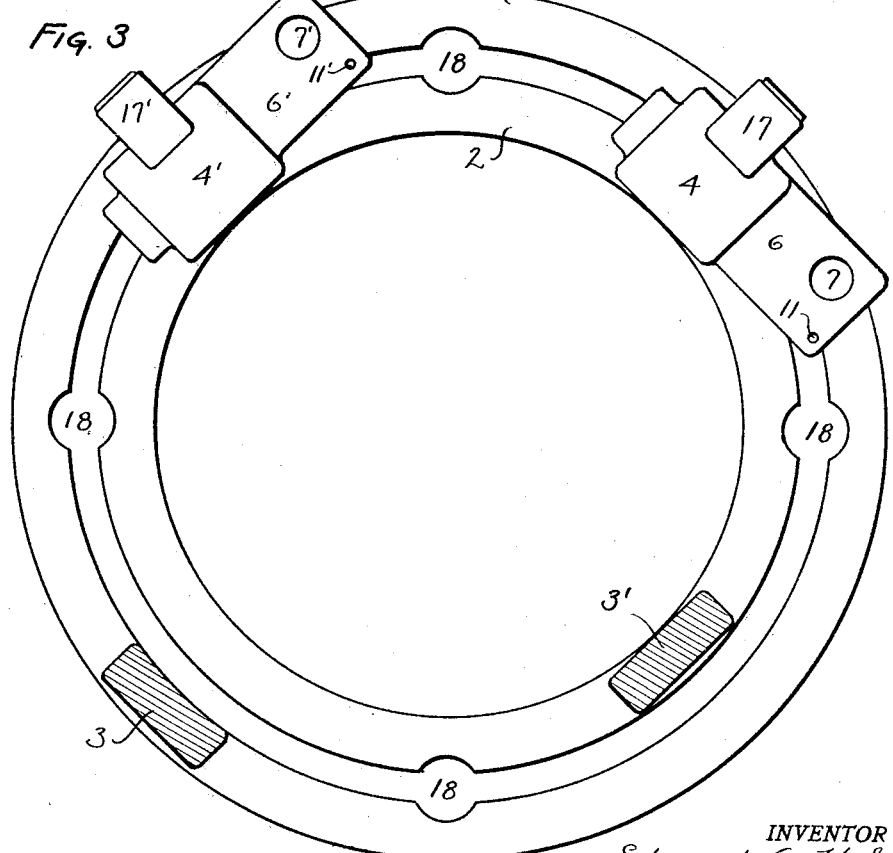

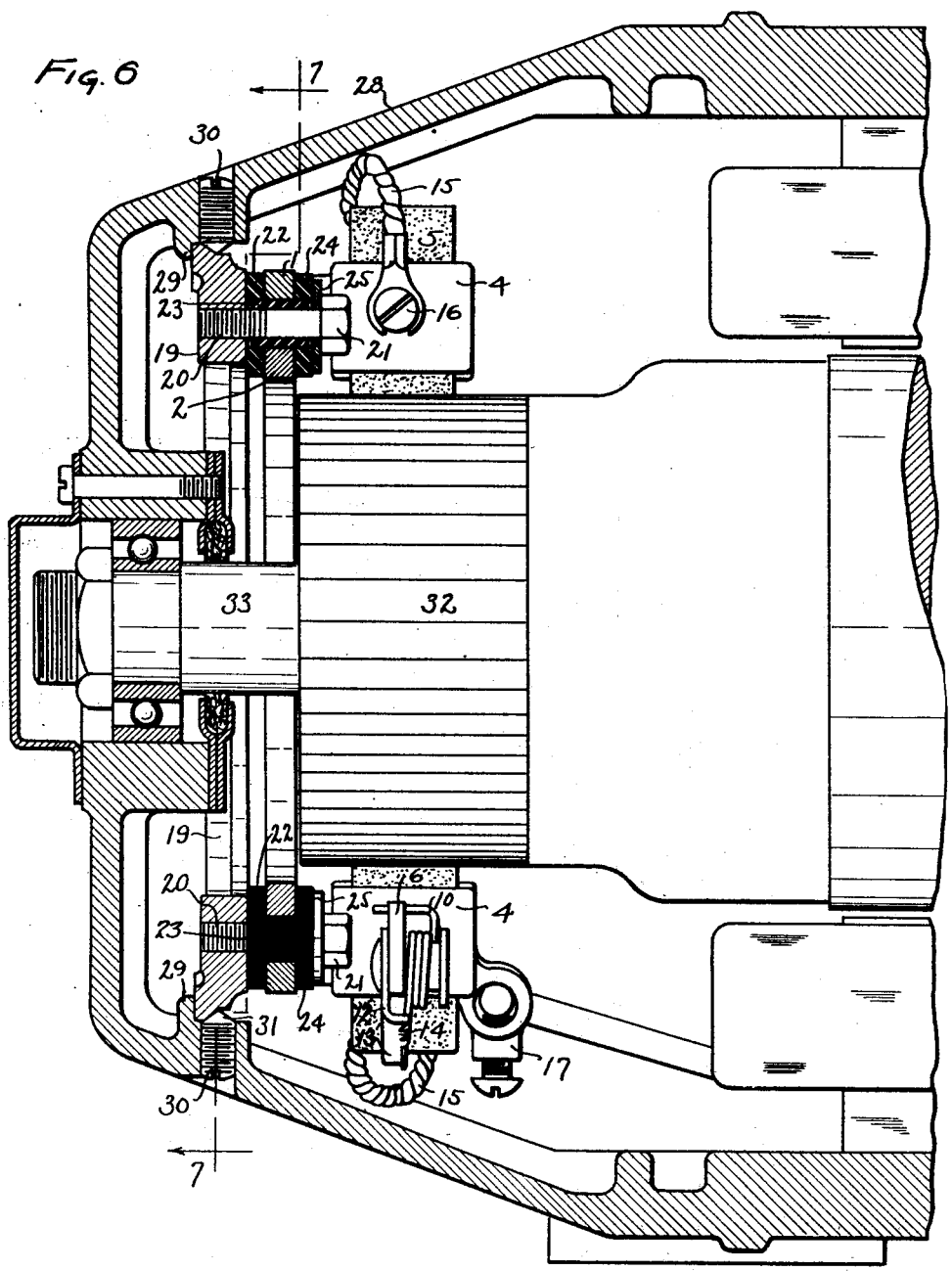

1,794,291

UNITED STATES PATENT OFFICE

EDWARD A. HOBART, OF TROY, OHIO, ASSIGNOR TO THE HOBART BROS. CO., OF TROY, OHIO, A CORPORATION OF OHIO

BRUSH SUPPORT FOR ELECTRICAL APPARATUS

Application filed August 2, 1928. Serial No. 297,024.

This invention relates to generators, and particularly to brush supports therefor.

It is my object to provide a brush support in a high amperage generator in order to eliminate cables, to provide a very rigid construction capable of carrying high amperage, and one that can be readily adjusted as a unit so as to adjust the brushes in suitable positions.

It is a further object to provide such adjusting means that will be self-aligning, so as to maintain proper brush contacts without arcing, no matter what the adjusted position may be.

It is a still further object to provide a construction that has all the advantages of a bus bar construction, which at the same time can be readily adjusted, replaced and renewed.

Figure 1 shows a plan view of the brushes and their ring support.

Figure 2 is a cross section on the line 2—2 of Figure 1.

Figure 3 is a view of the brush suporting rings with part of the brush brackets removed to show the relative position of the rings and the relative position of the brush brackets.

Figure 4 is a view of the outer ring with the brush brackets attached thereto.

Figure 5 is a similar view of the inner ring.

Figure 6 is a longitudinal section of the end of the housing enclosing the generator shaft and of the brush support attached to said housing.

Figure 7 shows the mounting of the supporting ring on the casing.

Figures 8 and 9 are sections of Figure 7 as indicated by the lines.

Figure 10 is a view showing the projections on the supporting ring.

This device is composed essentially of three ring members held in spaced relation to each other with insulating material between each one. Two of these ring members carry brush members, the parts of which are similarly constructed and for the same purpose.

Each brush ring carries two brush members. The outer ring is indicated by the numeral 1 as particularly shown in Figures 3 and 4, while the inner ring is indicated by the numeral 2 and is shown particularly in Figures 3 and 5.

From each of these rings there projects a bracket indicated by the numeral 3 for the outside ring and 3′ for the inside ring.

Hereafter the description will be confined to the structure of the outside ring which will apply to the structure of the inside ring with the exception that the numerals for the inside ring will be indicated by prime.

Each bracket extends upwardly from the face of the ring and is formed into a housing indicated by 4 which is adapted to receive a sliding brush member 5. These parts are made of any suitable material. Projecting from each brush housing is a flat extension arm 6 in which there is a large opening 7. This opening 7 is adapted to receive a pin 8, on which there is a ring member or washer 9, around which there is wrapped a wire spring 10. One end of this wire spring is attached to the projection by means of a hole indicated by 11. The other end of this spring is adapted to engage in a series of notches 14 formed in a blade member 13, which is part of a pivotally mounted bracket member 12, and pivoted to the pin member 8.

The outer end of the blade member 13 engages with the outer end of the brush member and always tends to hold this member in engagement with the commutator on the generator shaft.

By means of the notches 14 and the spring 10, the tension upon the brush member may be regulated by adjusting the spring in different notches 14.

To each brush there is attached a conductor 15, one end of which is attached to a terminal by means of a screw 16. There is also formed in connection with one brush member of each of the rings 1 and 2, a terminal member 17. The rings 1 and 2 are placed in spaced relation to each other with the ring 2 on the inside of ring 1.

When these rings are placed in this position, there is formed between them and in cooperative relation therewith, notches indicated by 18. The notches thus formed constitute a circular opening or hole adapted to receive screw members.

For the purpose of supporting the rings 1 and 2 in the position shown in Figure 3, there is provided a support ring 19. This ring has therein holes 20, in a position to correspond with the holes formed by the notches 18. These holes in the ring 19 are threaded and adapted to receive a screw member 21 which passes through the holes formed by the notches 18 in the rings 1 and 2. It is the purpose of these screws to hold the three rings in proper relation to each other with each ring insulated from the other.

For the purpose of insulating the rings 1 and 2 from ring 19, there is provided an insulating washer 22. This washer electrically separates the supporting ring from each of the other rings. Fitting around the screw 21 is an insulating sleeve 23 which surrounds the screw 21 and fits in the notches 18 formed in the rings 1 and 2, so that each of these rings is insulated from the other. There is also an insulating washer 24 which fits around the screw 21 and upon the rings 1 and 2. Fitting on the screw 21 is a washer 25 engaging with the insulating washer 24. When the screw 21 is manipulated to securely fasten the rings to each other, the rings 1 and 2 are thoroughly insulated from each other and from the ring 19.

It will be noticed from an observation of Figure 6 that the insulating sleeve 23 is sufficiently long to extend through the holes formed by the notches 18 and forwardly through the holes in the washers 22 and 23, thereby making a thorough insulation between the rings 1 and 2 and between rings 1 and 2 and 19.

As here shown, there are two brush members for each of the rings 1 and 2. One of each of these brush members has a terminal screw for the purpose of connecting the conductor thereto.

When the parts are assembled with the three rings held in fixed relation to each other but insulated therefrom by means of the screws and insulating parts just described, the whole assembly is mounted around the end of the generator shaft and supported by a supporting housing. For the purpose of supporting the parts as here assembled, there are projections indicated by 26 on the ring 19. These projections are here illustrated four in number and are of such length as may be found desirable. Each of these projections has a beveled face indicated by 27 against which a retaining member is adapted to act.

The housing or frame structure over the end of the generator shaft is indicated by 28 and is here shown to have at least four radically arranged parts. On each of these parts is formed a shoulder 29 which is adapted to receive in close fitting relation the ring 19 at the point of the projections 26. The outer edges of these projections are formed to present a part of a true circle.

For the purpose of securely holding the ring 19 and the other parts assembled therewith in proper spaced relation to the frame 28 and the shoulders 29, there is provided a screw 30 suitably located in the frame member 28. The inner end of this screw is conical in shape and is adapted to fit the beveled face 27 of the projection 26. This conical shape of the screw is indicated by 31.

This whole structure is adapted to fit over the end of a generator shaft 33 as shown in Figure 6. This shaft 33 carries a commutator 32 which is engaged by the brush members 5.

Having thus fully described my invention, what I claim as new and desire to protect by Letters Patent is:

1. In a dynamo electric machine having a frame and an armature shaft, the combination of a supporting ring, means for adjustably positioning said supporting ring in said generator frame, a pair of concentric rings having opposed notches adapted to be supported on said supporting rings in insulated relationship to it and to each other, means in said notches engaging each concentric ring to fasten said concentric rings to said supporting ring, spaced brush supports mounted on said rings and means of connecting a portion of said supporting ring into the generator frame, said brush supports being located equidistant from the center of the armature shaft of the generator.

2. In a brush support, a generator cage, a plurality of radially disposed retaining and adjusting screws with tapered heads, a plurality of spaced shoulders adjacent thereto on said cage, an adjusting brush support ring having cooperating shoulders for engaging with the shoulders of the cage, oppositely disposed tapered faces for engaging with the tapered faces of the retaining screws, whereby the adjusting ring carrying the brush supports may be rotatably and longitudinally adjusted of the generator cage, a pair of concentric rings mounted on said adjusting ring carrying supports for brushes located equidistant from the center of an armature shaft of the generator, common means carried on the adjusting ring for retaining said concentric rings in predetermined relationship one to the other and to the adjusting ring, and means to insulate said three rings one from the other.

3. In a brush support, a supporting ring having laterally extending spaced shoulders, one side of which is parallel to the side of the ring and the other side of which is tapered at an angle thereto, a pair of concentric brush supporting rings mounted on one side of said adjusting ring and common means for supporting said concentric rings on said supporting ring and holding said rings in spaced insulated relation to each other.

4. In a brush support, a supporting ring, a pair of spaced concentric rings arranged in the same plane and supported by the supporting ring, each concentric ring having notches adjacent notches in the other concentric ring, an insulating ring on each side of said concentric rings in line with the notches, insulating sleeves extending through said insulating rings and the notches, and common screw means passing through said insulating sleeves into the supporting ring to hold the rings assembled.

In testimony whereof, I affix my signature.

EDWARD A. HOBART.